United States Patent [19]
Broschard, III

[11] Patent Number: 5,520,551
[45] Date of Patent: May 28, 1996

[54] MOLDED LATCHING APPARATUS FOR PRINTED CIRCUIT MOUNTED COMPONENTS

[75] Inventor: John L. Broschard, III, Hershey, Pa.

[73] Assignee: The Whitaker Corporation, Wilmington, Del.

[21] Appl. No.: 348,025

[22] Filed: Dec. 1, 1994

[51] Int. Cl.⁶ .................................................. H01R 13/73
[52] U.S. Cl. ................................................................ 439/567
[58] Field of Search ............................... 439/567, 571, 439/572

[56] References Cited

U.S. PATENT DOCUMENTS

| | | | |
|---|---|---|---|
| 4,080,522 | 3/1978 | Schimmels | 200/295 |
| 4,139,727 | 2/1979 | Kuballa | 174/68.5 |
| 4,154,498 | 5/1979 | Wood et al. | 339/128 |
| 4,797,112 | 1/1989 | Weisenburger | 439/55 |
| 4,871,326 | 10/1989 | Coon | 439/502 |
| 4,900,272 | 2/1990 | Lange et al. | 439/630 |
| 5,112,235 | 10/1992 | Enomoto et al. | 439/83 |
| 5,178,554 | 1/1993 | Siemon et al. | 439/188 |
| 5,181,854 | 1/1993 | Masuda | 439/567 |
| 5,241,451 | 8/1993 | Walburn et al. | 439/567 |
| 5,295,862 | 3/1994 | Mosquera . | |
| 5,334,048 | 8/1994 | Bowers et al. | 439/567 |
| 5,334,049 | 8/1994 | Kachlic et al. | 439/567 |
| 5,334,827 | 8/1994 | Bleier et al. | 235/492 |
| 5,435,750 | 7/1995 | Kosmala | 439/567 |

OTHER PUBLICATIONS

U.S. Patent Application Ser. No. 08/348,019* filed Dec. 1, 1994.
U.S. Patent Application Ser. No. 08/348,015* filed Dec. 1, 1994.
AMP Application Specification 114–40015, pp. 1–10.

*Primary Examiner*—Gary F. Paumen

[57] ABSTRACT

A smart card connector with a card slot (10) for receiving a smart card includes a plurality of data contact (12) located in a housing consisting of a molded housing base (4) and a molded housing cover (6). The housing base (4) is intended to be mounted on a printed circuit board and includes integrally molded mounting posts (58, 60). Latching mounting post (60) includes an inclined lead-in surface (64) and a perpendicular latching surface (62) which engages the bottom of the printed circuit board to latch the smart card connector to the printed circuit board. The other latching post (58) includes an inclined lead-in surface 68 and an inclined upwardly facing surface (66) which can engage the printed circuit board anywhere along its length to engage a printed circuit board having a thickness which is either less than or greater than its nominal value.

16 Claims, 8 Drawing Sheets

MOLDED LATCHING APPARATUS FOR PRINTED CIRCUIT MOUNTED COMPONENTS

FIELD OF THE INVENTION

This invention relate to the attachment of electrical components, such as electrical connectors to printed circuit boards. More specifically this invention relates to mounting posts or latching devices or latching holddowns which can be used with components such as electrical connectors. Even more specifically this invention relates to components, such as electrical connectors which employ integrally molded mounting posts to secure the component to a printed circuit board. This invention also relates to mounting posts which can be used on components such as smart card connectors or readers which are mounted on printed circuit boards and which are accessible so that a user can insert a smart card or memory card in the smart card connector.

BACKGROUND OF THE INVENTION

Components in addition to active electronic devices must be mounted on printed circuit boards. For example, electrical connectors must be mounted on either through hole or surface mount printed circuit boards to permit interconnection of other printed circuit boards or electrical cables. Although these components will be attached to the printed circuit board by virtue of the solder connections, additional mechanical connection is desirable. First, some means of attaching the device to the printed circuit board prior to soldering the leads to the printed circuit board is needed. Perhaps more importantly, mechanical attachment of the components to the printed circuit board is needed to prevent damage to the solder joint as a result of mechanical forces and loads applied to the component.

One common means of mechanically attaching a component, such as an electrical connector to a printed circuit board is to use mounting screws to attach the component. This approach, however requires the use of additional components including screws, nuts and washers. These additional components not only add packaging and inventorying complications, but perhaps more importantly, add additional assembly operations with a resulting increase in the applied or total cost of the product.

An alternative method of attaching components, such as electrical connectors, to printed circuit board is to use special metal fasteners. These fasteners can be initially mounted in the electrical connector to minimize handling problems, or they can be inserted at the time the component is assembled to the printed circuit board. One example of fasteners of this type is shown in U.S. Pat. No. 5,295,862. Although these metal fasteners may be easier to assemble than screws, they still represent added components and added cost.

Another common approach to attaching components, such as electrical connectors, to printed circuit boards is to use mounting fasteners or holddowns which are integrally molded as part of the component housing. These molded fasteners are usually inserted into holes on printed circuit boards and generally employ a downwardly facing inclined or beveled lead-in surface. These fasteners can be deflected upon insertion into a hold and will snap back so that an upwardly facing perpendicular latching surface engages the board after complete insertion. Examples of such snap latch fasteners are shown in U.S. Pat. Nos. 4,080,522; 4,139,727; and 5,178,554.

A similar conventional molded mounting fastener is a split mounting post. These mounting posts are generally cylindrical with a slot separating the post into two resilient cantilever beams. Inclined lead in surfaces and perpendicular latching surfaces are normally located at the distal end of these split beam posts. These lead-ins and latching surfaces can be employed on both posts, but the molds must either provide clearance for molding these latching surfaces or incorporate side pulls into the molds, or require that overhanging lips on these latching features deflect to snap out of the mold. In some cases, only one of the posts will include lead-in and latching surfaces on the ends of the posts. One example of a split beam mounting post is shown in U.S. Pat. No. 5,112,235.

SUMMARY OF THE INVENTION

A printed circuit board connector for use with a smart card has a housing base which is mounted directly on a printed circuit board on which the circuitry for a smart card reader is located. The housing base is molded and includes a plurality of molded mounting posts. In the preferred embodiment, two mounting posts are located on each side of the connector. At least one of the posts, and preferably all of the posts, are molded with two cantilever beams extending from the lower surface of the housing base and separated by a central slot extending along the axis of the post toward the housing base. Each cantilever beam has an independent free end, and each has an inclined lead-in surface at the post distal end. Each cantilever beam can then deflect upon insertion of the mounting post into a hole in the printed circuit board. One of the cantilever beam has a conventional perpendicular latching or locking surface which engages the lower surface of the printed circuit board after the post has been inserted through the printed circuit board mounting hole and the cantilever beam snaps back into its normal position. The other cantilever beam has an inclined latching surface extending from the lead-in toward the housing base. This inclined latching surface will engage the printed circuit board even if the mounting post is not fully inserted through the printed circuit board. It will also tend to cinch the connector close to the board, when the board is thinner than normal to eliminate any loose fit between the board and the connector. Therefore the inclined latching surface will tend to account for tolerance variations, both in the dimensions of the housing base and latching posts, but also in the thickness of the printed circuit board.

DETAILED DESCRIPTION OF THE PREFERRED EMBODIMENTS

Figure 1:
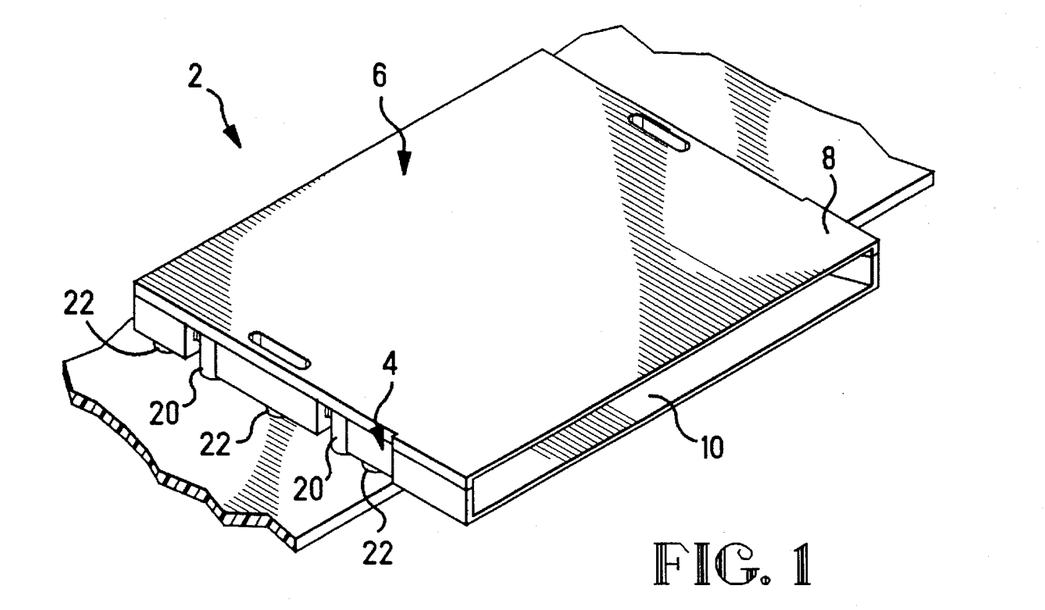
FIG. 1 is a perspective view of a representative embodiment of a smart card connector mounted on a printed circuit board.

The smart card connector 2 shown in FIG. 1 is intended to be mounted in a printed circuit board and to provide the interface in which a smart card can be inserted so that data can be read from or written into the smart card by the smart card interface circuitry. The embodiment shown in FIG. 1 includes a housing base 4 and housing cover 6, both of which have a scoop or card entry shroud 8 at the front of the housing. The base 4 and cover 6 form a card slot 10 which extends from the front of the housing through the shroud or scoop 8 to the rear of the smart card connector 2.

The housing base 4 and the housing cover 6 are each injection molded form a conventional thermoplastic material. In the preferred embodiment of this invention, these housing components are molded from a PCT plastic such as Ektar, a plastic supplied by Kodak.

FIG. 1 also shows mounting posts 20 extending from the bottom of the housing base 4 to secure the smart connector to a printed circuit board. FIG. 1 also shows standoffs 22 which positions the smart connector above the printed circuit board to allow for proper installation and cleaning of the solder contacts on the printed circuit board.

Figure 2:
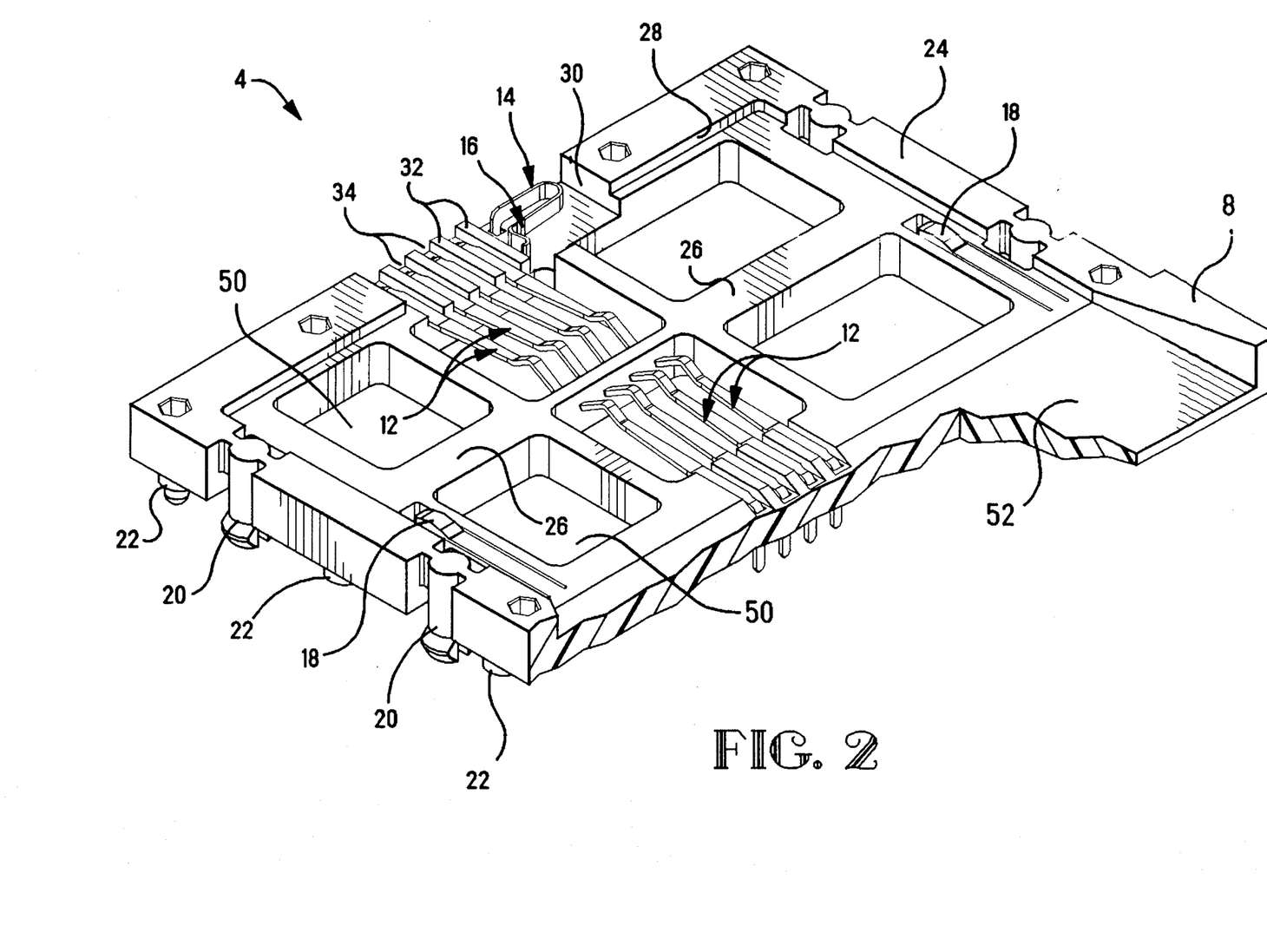
FIG. 2 is a perspective view of the smart connector housing base showing the position of data contacts, an end position switch and mounting posts for positioning the smart connector on a printed circuit board.

The housing base 4 is also shown in FIG. 2 where the upper surface of the housing base is shown. The upper surface of the housing base 4 comprises the bottom of the card slot 10. In the embodiment shown in FIG. 2, eight data contacts 12 are mounted in the housing base 4 in position to engage contact pads on a smart card inserted into the card slot 10. In this embodiment, four data contacts 12 extend from the front of the housing base 4 and four other offset data contacts 12 extend from the rear of the housing base 4. The data contacts are resilient and contact portions of the data contacts 12 extend above the upper surface of the housing base 4 where they will engage pads on a smart card.

The smart connector 2 also includes a normally closed end position or end of stroke switch which is located at the rear of the card slot 10 and housing base 4. The end position switch is formed by a switch spring 14 and a switch post 16, both of which are anchored in the housing base 4. The switch spring 14 and the switch post 16 are positioned on one side of the four data contacts 12 which extend from the rear of the housing base 4. The housing base also includes two diverter springs 18 which are part of the molded housing base 4. These diverters 18 are located slightly in front of the contact points of the front data contacts 12 and one diverter 18 is located on either side of the array of data contacts 12.

The housing base 4 has a peripheral rim 24 which extends around the two sides and partially along the rear of the upper surface of the housing base 4. The top of rim 24 is above the interior upper surface 26 and the gap formed between the top of the rim 24 and the surface 26 forms the lower half of the housing slot 10 in the assembled smart card connector 2. A shoulder 28 extends between peripheral rim 24 and surface 26 adjacent the two sides of the back of the housing base 4. This shoulder 28 serves as a card stop when a smart card is fully inserted into the housing slot 10. A channel 30, the lower surface of which is recessed below surface 26, is located between side portions of the rim 24 along the rear of the housing base 4. The four rear data contacts 12, the switch spring 14 and the switch post 16 are anchored to the housing base 4 in the channel 30. Separation ribs 32 extend up from the bottom of channel 30 to form contact slots 34 in which individual data contacts 12 are located. Six generally square openings 50 extend through the surface 26 from its top to the bottom. The four openings 50 located along the sides of the housing base 4, adjacent to the rim 24 are formed to eliminate unneeded plastic and are optional. The two center openings 50 provide clearance for deflection of the data contacts 12 to flex when a smart card is inserted into the slot 10. The mounting posts 20 and the standoffs 22 are molded as part of the rim 24 and each extends from the lower surface or rim 24. The lower half of the shroud or scoop 8 is partially shown at the front of the housing base 4 in FIG. 2. This shroud is shown broken away to expose the other elements of the housing base 4 and components mounted in the housing base. The inclined surface 52 on the shroud or scoop 8 provides a lead-in for insertion of a smart card into the housing slot 10.

Figure 3:
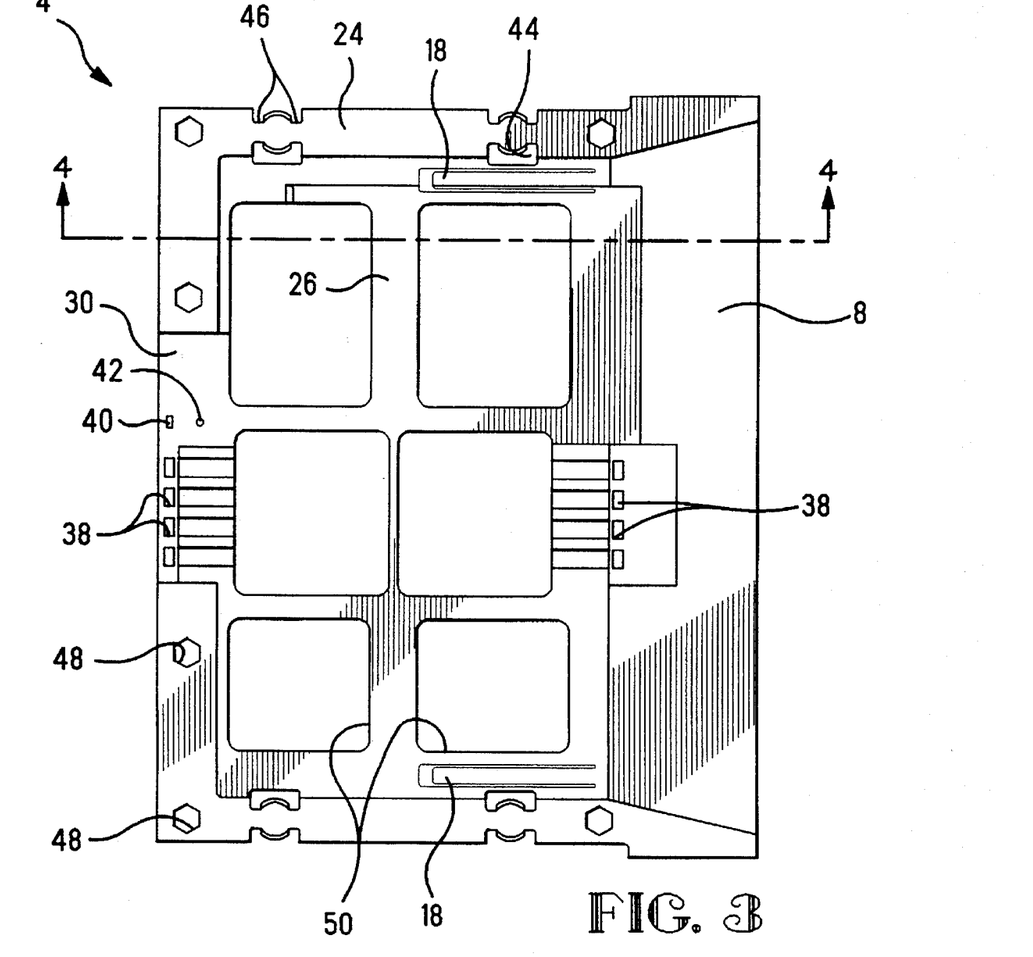
FIG. 3 is a top plan view of the smart connector housing base.
Figure 4:
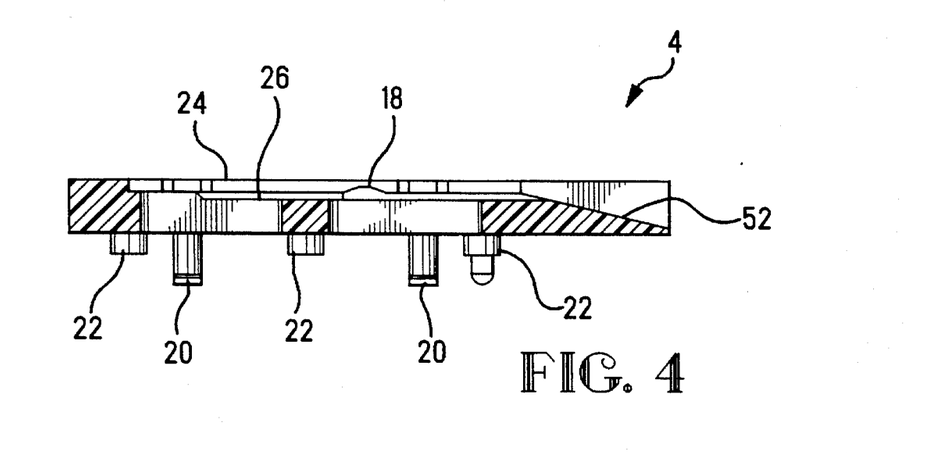
FIG. 4 is a side section view of the housing base taken along section line 4—4 in FIG. 3 of the smart connector base showing the front shroud or scoop and the mounting posts.

Other details of the housing base 4 are shown in the top plan view of FIG. 3 and the side sectional view of FIG. 4. As previously discussed, the data contacts 12, the switch spring 14 and the switch post 16 are mounted in the housing base 4. Data contacts mounting holes 38, in which data contacts are inserted, are located in the front of the housing base 4, behind the shroud 8 and in the channel 30 formed at the rear of the housing base 4. The switch mounting hole 40 is located in the channel 30 to the rear of the switch post mounting hole 42, both of which are located on the side of the mounting holes 38 for the data contacts 12. The mounting posts 20 and the standoff posts are shown extending from the lower surface of the housing base 4 along the outer edges. The housing base 4 is molded using a straight pull mold without side pulls. Clearance holes 44 and grooves 46 extend through the rim 24 on opposite sides of the mounting posts 20 so that latching and camming surfaces by be formed adjacent to the lower ends of the mounting posts. These structures will be subsequently discussed in more detail. Six cover mounting holes 48 are located in the rim 24 along the sides and rear of the housing base 4. These holes 48 will receive cover mounting lugs to secure the cover 6 the base 4 as will be apparent during the subsequent discussion of the cover. Alternatively eight holes and lugs can be used to attach the cover.

Figure 5:
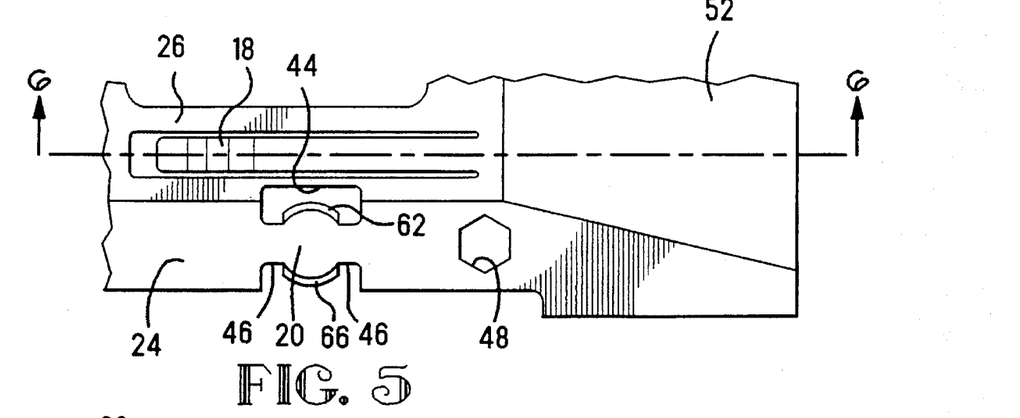
FIG. 5 is a fragmentary view of the housing base showing the position of the base diverter springs.

FIGS. 5–8 are fragmentary views of different features on the housing base 4. FIG. 5 shows the portion of the plan view of the housing base 4 containing the diverter springs 18, the mounting posts 20 and the cover mounting holes 48. Each diverter spring 18 comprises a molded cantilever beam which is integral with the base 4. Two slots on either side of the diverter spring 18 join a top slot to define the diverter spring. This cantilever beam is formed during molding of the base by blades or walls which form the slots. As can best be seen in the side sectional view of FIG. 6 each diverter spring 18 has a raised semi cylindrical boss 54 adjacent its free end and spaced from the base portion 56 of the cantilever diverter spring 18. This boss 54 normally extends above the upper surface 26 of the housing base 4 in the card slot area 10. When a card is inserted into the card slot 10, the card engages the boss 54 and the diverter 18 is forced downward while the card is urged upward toward the top of the slot 10. This action serves several purposes. First it tends to provide a controlled lead-in for the card slot and prevents the card from snagging on any irregular surface on the housing base. Second by urging the card upward, less force is exerted against the resilient data contacts 12, especially during relative movement between the card and the data contacts 12, thus tending to prolong the life of the data contacts 12. Engagement of the diverter spring 18 with the card also produces a frictional force which tends to prevent movement of the card back out of the slot and tends to resist the force exerted by the end position spring 14.

Figures 6, 7, 8:
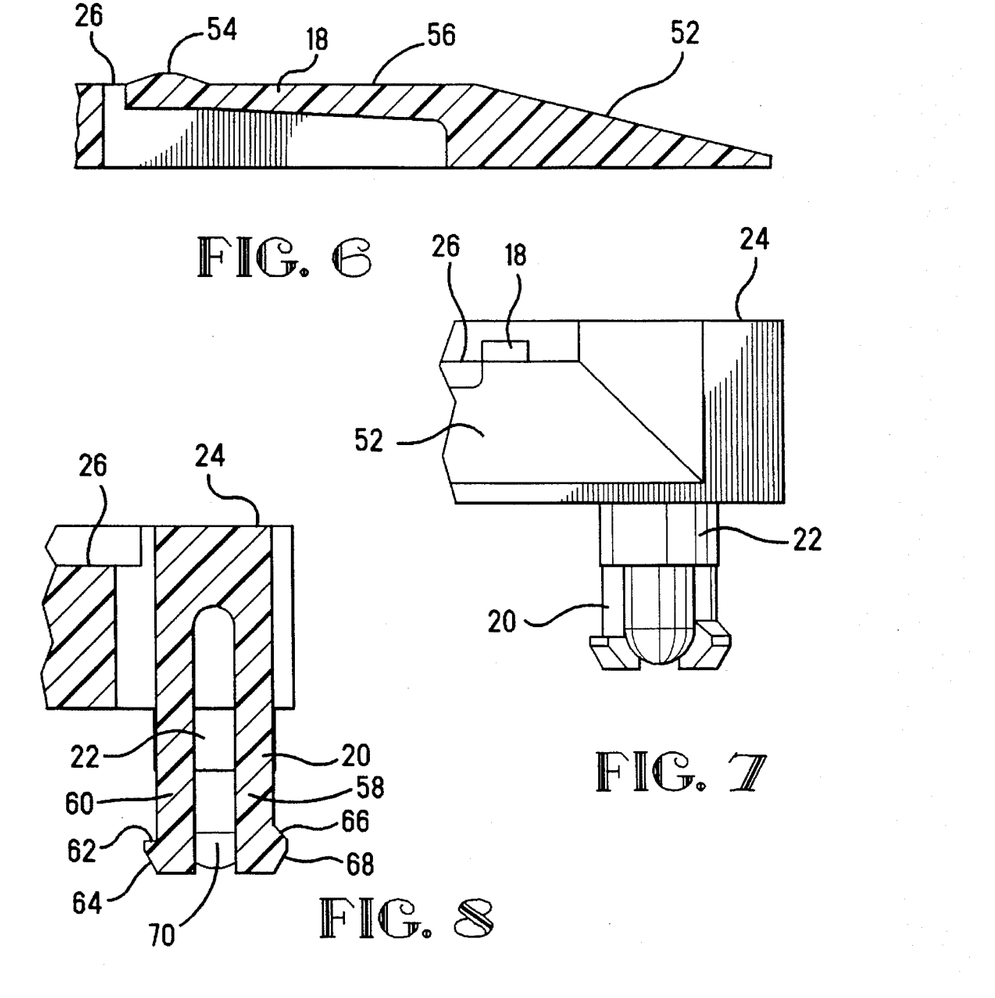
FIG. 6 is side section view of the housing base taken along section lines 6—6 in FIG. 5 showing the diverter springs.
FIG. 7 is a fragmentary side view of the housing base showing the mounting posts.
FIG. 8 is a side sectional view of the housing base showing the mounting posts.

FIG. 5 also shows the configuration of the clearances 44 and 46 and upwardly facing surfaces 62 and 66 on the mounting posts 20 which are formed by molding pins extending through these clearance openings. FIGS. 7 and 8 show more detail of the mounting posts 20. Each mounting posts comprises to separate legs extending form the lower surface of the housing base 4. These two legs are formed by a slot 70 extending between the lower surface of the base 4 and the free ends of the mounting posts 20. Each of the mounting post legs is flexible. A mounting post latching leg 60 is located on the interior side of slot 70 while a mounting post cinching leg 58 is located adjacent the exterior side of the housing base 4. As can be best seen in FIG. 8, each of the legs has an enlarged section adjacent its distal end. The latching mounting post leg 60 has a downwardly facing beveled or inclined surface 64 and an upwardly facing latching surface 62 which extends perpendicular to the axis of the mounting post leg 60. When the housing base 4 is inserted downwardly into a mounting hole in a printed circuit board, the beveled surface 64 causes leg 60 to resiliently cam inwardly to permit entry of the leg 60 into the mounting hole. Once fully inserted, the latching surface 62 will engage the lower surface of the printed circuit board to prevent upward extraction of the housing base 4 and the smart card connector 2. Only an intentionally applied lateral force on mounting post leg 60 will disengage the latching surface 62 from the printed circuit board. The other mounting leg 58 also has a downwardly facing beveled surface 68 which again cams this leg inwardly to permit insertion of the mounting post 20 into a mounting hole. However, cinching leg 58 has an upwardly facing beveled surface 66. This upwardly facing beveled or inclined surface 66 does not latch against the bottom of a printed circuit board in the same manner as latching surface 62. Instead this beveled surface engages the printed circuit board along the edge of the post mounting hole and pulls the housing base 4, and the smart connector 20 towards the printed circuit board on which it is mounted if the thickness of the printed circuit board is less than its nominal dimension. The connector 2 will then fit snugly against the printed circuit board helping to insure that the smart connector is properly portioned on the printed circuit board. Alternatively, the upwardly facing beveled surface 66 will provide a greater range of engagement with printed circuit boards having a thickness greater than its nominal dimension. For these thicker printed circuit boards, the latching surface 62 on mounting post leg 60 may not fully deploy because it remains within the confines of the printed circuit board hole. This is of course true for conventional mounting posts which employ only a perpendicular latching surface. The upwardly facing beveled surface 66 will however partially engage the lower surface or the printed circuit board, or at least the edge of the printed circuit board, to provide some latching engagement. This beveled surface will help take up any tolerances in the printed circuit board and the housing base 4 to insure a tight rather than a loose fit. Latching is still maintained by the perpendicular surface 62 on the other leg 60 on most printed circuit boards.

Figure 9:
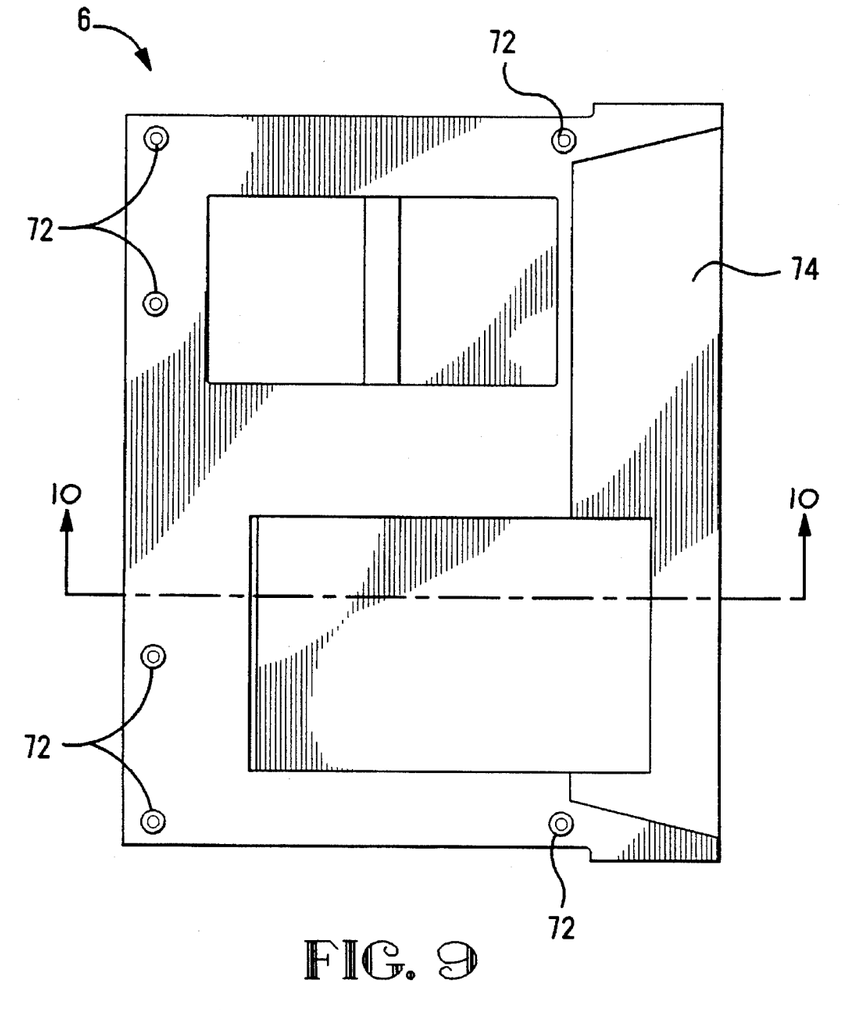
FIG. 9 is a view of the bottom of the housing cover.
Figure 10:
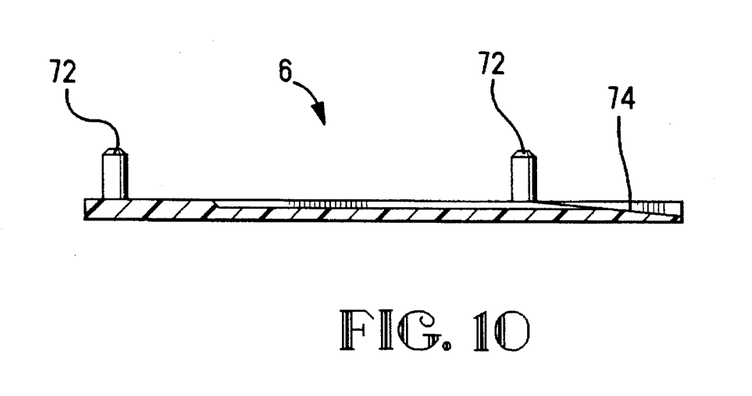
FIG. 10 is a section view of the housing cover taken along section line 10—10 in FIG. 9.
Figure 11:
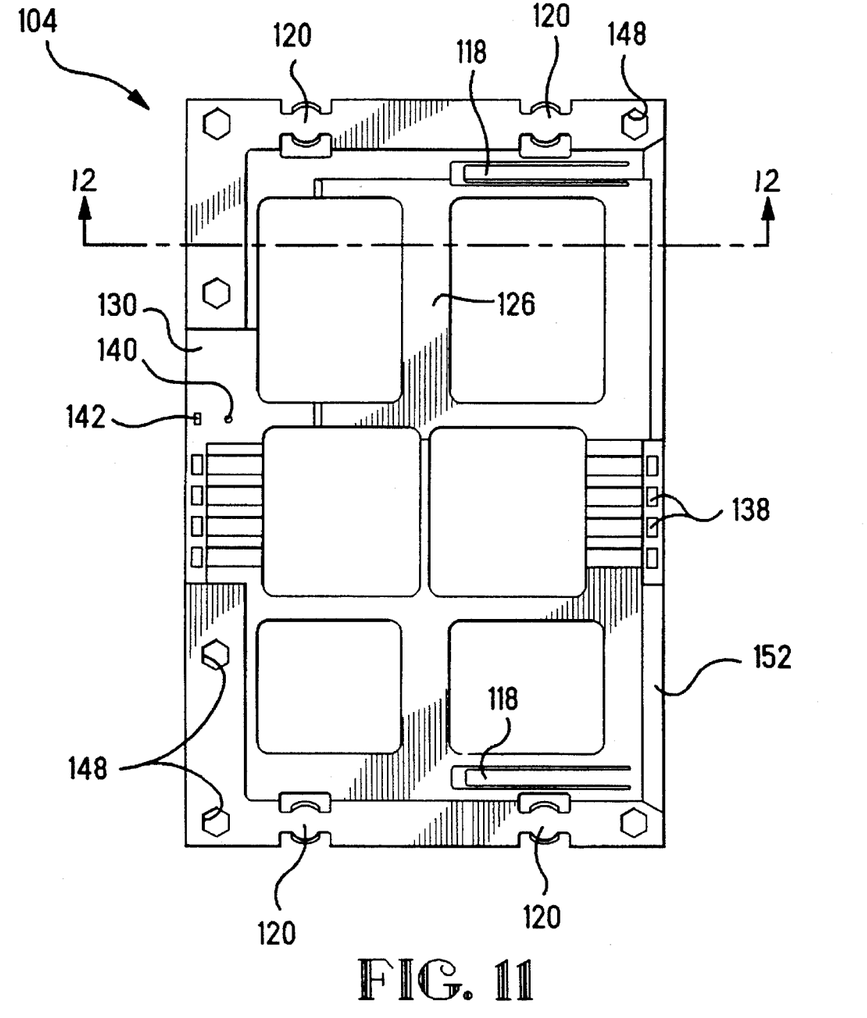
FIG. 11 is a top plan view of a second embodiment of a smart connector housing base which does not include a front shroud.
Figure 12:
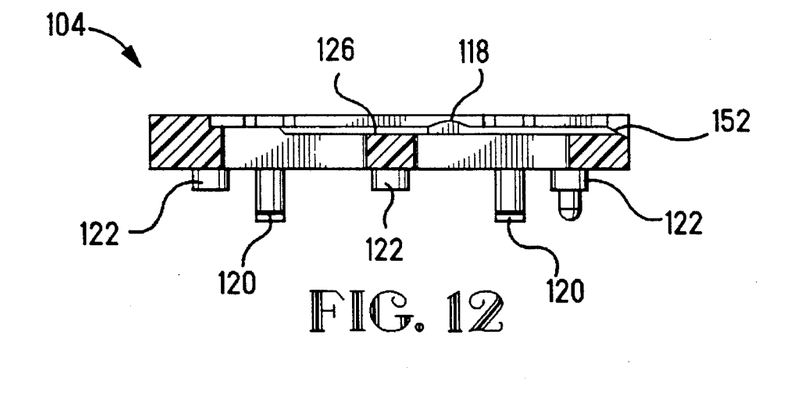
FIG. 12 is a side sectional view of the housing base shown in FIG. 11.
Figure 13:
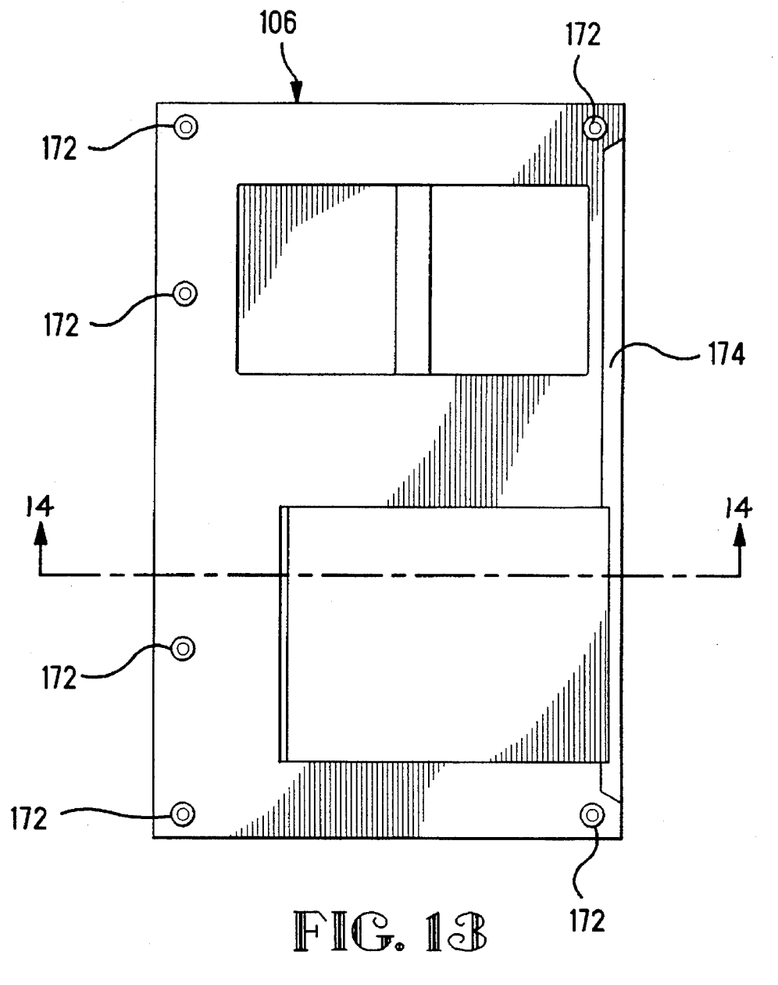
FIG. 13 is a bottom view of a housing cover which is used with the embodiment of the housing base shown in FIGS. 11 and 12.
Figure 14:
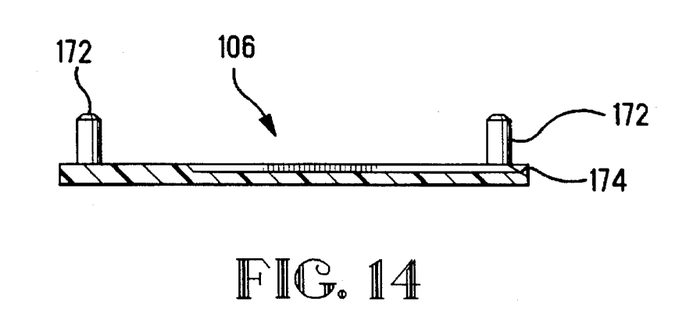
FIG. 14 is a side sectional view of the housing cover shown in FIG. 13.

The housing of this embodiment of the smart connector is a two piece member consisting of the housing base 4 and a housing cover 6 which is attached to the base. The cover 6 is shown in FIGS. 9 and 10. Cover 6 is a substantially flat molded member formed of the same material as the base 4. A downwardly facing inclined surface 74 is located on the front of the cover 6 and together with opposed inclined surface 52 on the base 4, forms the inclined entry scoop or shroud 8. The cover also has six downwardly extending lugs 72 molded into the bottom surface of the cover 6. These lugs 72 are positioned for insertion into lug mounting holes 48 on the housing base 4. The cover 6 can be the be attached simply by inserting the lugs 72 into holes 48. Any number of conventional techniques can be used to secure the lugs 72 in holes 48. The lugs and holes can be dimensioned for an interference or press fit. Alternatively the lugs 72 can be ultrasonically bonded in the holes 48 or they can be heat staked. The lugs can also be provided with latching surfaces to secure the cover 6 to the base 4. Alternatively the cover 6 could be secured to the base by using latches which engage the opposite member around the periphery.

FIGS. 11–14 show alternate embodiments of a housing base 104 and cover 106 which does not include a lead-in shroud or scoop. This alternate embodiment is otherwise the same as the embodiment of FIGS. 1–10. Similar reference numbers have been used to identify corresponding components in both embodiments, with the components of the second embodiment being identified by a 100 series of numerals. For example the mounting posts are referred to using the numeral 120 in the second embodiment, and the second embodiment diverter springs are referred to by the numeral 118. This unshrouded embodiment could be used in applications in which the lead-in is not necessary. For example, this embodiment could be mounted on a chassis which included a lead-in as part of the chassis. A third embodiment, similar to the second embodiment would include a separate attachable shroud which could be mounted at the front of the housing base 104 and cover 106 so that the same base and cover components could be used in either a shrouded or an unshrouded configuration.

Figure 15:
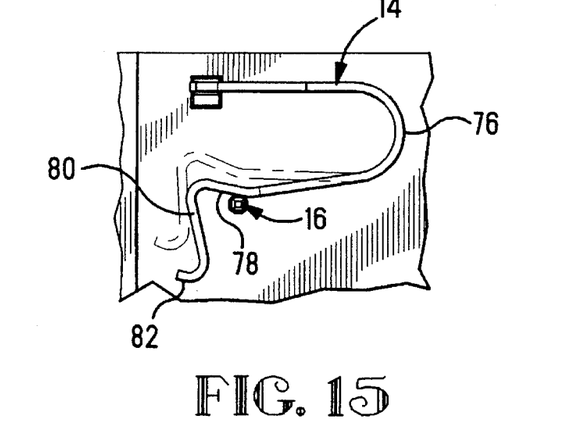
FIG. 15 is a top plan view of the spring and post which form the end position switch showing the normally closed position of the switch, with the deflected or open position of the switch spring shown in phantom.

The data contacts 12, the switch spring 14 and the switch post 16 can be used with any of the embodiments of the housing base and cover. FIG. 15 shows a top plan view of the switch spring 14 and the switch post 16 which together form the normally closed end position switch used in this smart connector. The switch spring 14 comprises a stamped and formed member which is fabricated from a conventional spring metal. The spring is formed in a U-shaped configuration formed by two arms and a connecting bight which together form the deflectable spring section 76. The forward portion of this deflectable spring section joins a wiping contact section 78 which is formed toward the rear portion of the spring about an angle of approximately one hundred fifty degrees. This contact or wiping section 78 joins a forward extension 80 which is formed at an angle of approximately fifty five degrees. This forward extension 80 extends into the card slot 10 when mounted on the housing base 4. A card engaging tab 82 is formed on the end of the forward extension 80 to provide a card engagement surface. When positioned in the housing base 4, the tab would normally be in the card slot 10.

The post 16 can be any of a number of simple contact pins. In the preferred embodiment, this post 16 is in the form of a brass wire, having a outer diameter of approximately 0.0169 inch, which can be plated with a noble metal in the contact area and can have a tin lead plating at the end to be soldered in a printed circuit board. A interference retention area can be stamped in this post to provide an interference fit of the wire post 16 in the post mounting hole 42 in the channel 30 of the housing base 4. Alternatively this post could be formed using a conventional square post configuration.

The engagement between the post 16 and the spring 14 can best be seen in FIG. 15. In the normally closed position the post 16 engages the spring approximately in the middle of the wiping contact section 78. When a card engages the tab 82, the spring 16 can be deflected rearwardly to approximately the position represented by the phantom lines in FIG. 15. In this open position the spring 16 is no longer in engagement with the post 16. Total travel between the closed and the open positions can be on the order of 0.030 inch. Opening the switch would be interpreted by the smart card reader as indicating that a card had been inserted into card slot 10 into engagement with the rear card stop shoulder 28. At this point the diverter springs 18 would engage the lower surface of the card and would provide a reactive force against the restoring force of the spring 14. When the card is removed the spring 14 will return to its normally closed position. Since the wiping contact section 78 is angled relative to the spring section 76 and engages the post 16 in an inclined tangential direction, there is a wiping action between the spring 14 and the post 16 tending to remove contaminates from the mating surfaces and insure reliability of the contact. The U-shaped spring is the only resilient member and this spring occupies less space than the conventional dual resilient members normally used in end position switches.

Figure 16:
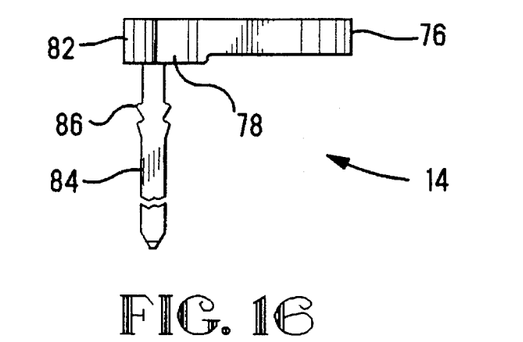
FIG. 16 is a side view of the switch spring shown in FIG. 15.

FIG. 16 shows the mounting leg 84 located on the spring at the end of the deflectable section 76 opposite from the wiping contact section. This mounting leg extends generally perpendicular to the other spring sections and includes anchoring barbs 86. When the mounting leg 84 is inserted into spring mounting hole 40 in the housing base 4, these anchoring barbs engage the housing base to secure one end of the spring in the base. The distal end of the leg 84, which includes a tin lead plating, forms a solder tail which extends below the bottom surface of housing base 4 where it can be soldered into a plated through hole in a printed circuit board.

Figure 17:
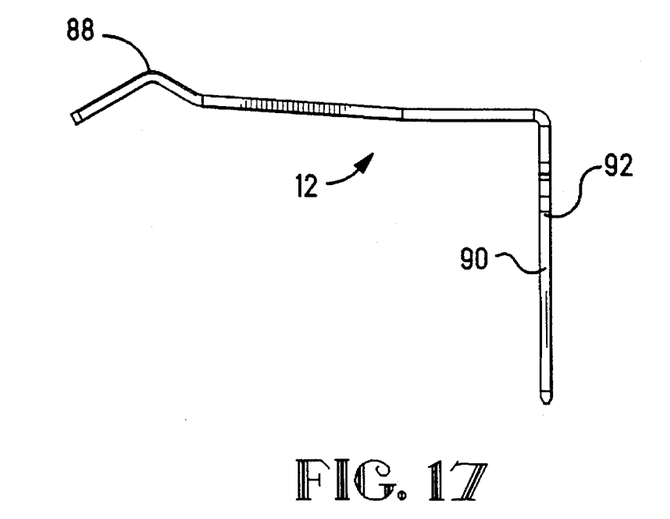
FIG. 17 is a side view of a data contact used in the smart connector.
Figure 18:
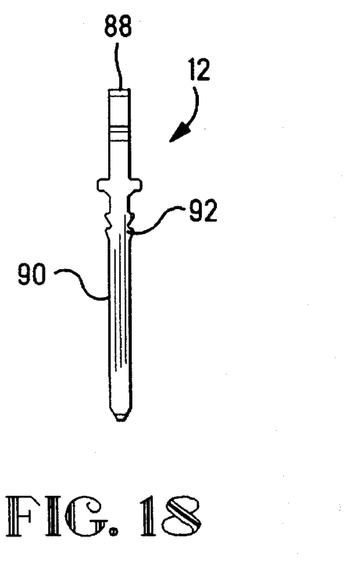
FIG. 18 is a view of a data contact showing the anchoring leg of the data contact.

FIGS. 17 and 18 show the data contacts 12. These contacts are substantially conventional resilient contacts which include a contact arm 88 with a contact point located adjacent its distal end. The opposite end of the data contact 12 is bent at a right angle to form an anchoring leg and solder tail section 90. Anchoring barbs 92 are formed adjacent the right angle bend so that the data contacts 12 can be press fit into the contact mounting holes 38 at the front and the rear of the housing base 4.

Although only one embodiment of the mounting posts are depicted herein, the basic invention is applicable to other configurations. For example these posts could be easily adapted to a square, rectangular or elliptical configuration. This mounting post could also be employed to attach the component to a housing wall instead of to a printed circuit board. These mounting posts could then be used with cable to cable electrical connectors. Of course this mounting post configuration could be adapted to numerous electrical connector configurations instead of merely using them for the smart card connector disclosed herein. Therefore the claims submitted with this representative disclosure are not limited to the exact configuration shown herein.

I claim:

1. A printed circuit board mounted component having a molded housing and including integrally molded mounting posts extending from a surface of the housing to be mounted adjacent the printed circuit board, at least one of the molded mounting posts comprising two cantilever beams separated by a slot, each of the posts having an inclined lead-in surface at the post distal end, one of the beams having a latching surface joining the the corresponding inclined surface and extending generally perpendicular to the cantilever beam axis, the other beam having an inclined latching surface joining the inclined lead-in surface and facing toward the surface of the housing to be mounted adjacent the printed circuit board.

2. The printed circuit board mounted component of claim 1 wherein each of the mounting posts include two cantilever beams, one of which includes a generally perpendicular latching surface and one of which includes an inclined latching surface.

3. The printed circuit board mounted component of claim 1 wherein each mounting post having two cantilever beams is located adjacent the periphery of the housing.

4. The printed circuit board mounted component of claim 3 wherein the housing includes a clearance hole aligned with one of the latching surfaces to provide clearance for a molding pin, the other latching surface being located on the periphery of the housing.

5. The printed circuit board mounted component of claim 4 wherein the housing includes recessed clearance on the edge of the housing in alignment with the latching surface located on the periphery of the housing to provide clearance for a surface on the mold forming the latching surface located on the periphery of the housing.

6. The printed circuit board mounted component of claim 5 wherein the inclined latching surface is located adjacent the periphery of the housing.

7. The printed circuit board mounted component of claim 1 wherein standoff posts are located adjacent to the mounting posts, the standoff posts engaging the surface of the printed circuit board so that the housing remains spaced from the printed circuit board.

8. The printed circuit board mounted component of claim 1 wherein each of the mounting post cantilever beams is resilient to permit insertion of the mounting posts through mounting holes in the printed circuit board.

9. The printed circuit board mounted component of claim 1 wherein the slot extends into the housing past the surface of the housing to be mounted adjacent the printed circuit board.

10. The printed circuit board mounted component of claim 1 wherein the mounting posts are joined to the housing along portions of the circumference of the posts between the circumferential extent of the latching surfaces.

11. A printed circuit board mounted connector having a molded housing and including integrally molded mounting posts extending from a surface of the housing to be mounted adjacent the printed circuit board, at least one of the molded mounting posts comprising two deflectable cantilever beams separated by a slot, each of the posts having an inclined lead-in surface at the post distal end, one of the beams having a latching surface joining the corresponding inclined surface and extending generally perpendicular to the cantilever beam axis, characterized in that the other beam has an inclined latching surface near the inclined lead-in surface and facing toward the surface of the housing to be mounted adjacent the printed circuit board, the inclined latching surface comprising a means to account for tolerances in the thickness in the printed circuit board.

12. A connector for use with a smart card, the connector comprising:
   a housing comprising a base and a cover, the base and the cover defining a card slot between the base and the cover, the card slot being open at the front of the housing, the card slot extending toward the rear of the housing;
   card contact means extending into the slot, insertion of the smart card into the card slot resulting in engagement of the card contact means with the smart card;
   mounting posts on the housing base for mounting the connector to a printed circuit board, the mounting posts being located on opposite sides of the housing base with the card slot extending therebetween, at least one of the mounting posts comprising two cantilever beams separated by a slot, each of the posts having an inclined lead-in surface at the post distal end, one of the beams having a latching surface joining the corresponding inclined surface and extending generally perpendicular to the cantilever beam axis, the other beam having an inclined latching surface near the inclined lead-in surface and facing toward the housing base, so that the inclined latching surface can engage a printed circuit board having a thickness either greater than or less than the nominal thickness of a printed circuit board which will be engaged by the perpendicular latching surface.

13. The connector of claim 12 wherein the housing base includes standoff posts located adjacent to the mounting posts, the standoff posts engaging the printed circuit board so that the housing base remains spaced from the printed circuit board.

14. The connector of claim 13 wherein the housing base includes a peripheral rim, the lower surface of the card slot being recessed relative to the top of the peripheral rim, the mounting posts and the stand off posts extending from the bottom of the housing base below the peripheral rim.

15. The connector of claim 14 wherein the peripheral rim includes cover mounting holes for receiving cover latching lugs extending from the lower surface of the cover, the cover mounting holes being located beside the mounting posts and standoff posts.

16. The connector of claim 12 wherein data contacts are mounted in the front and the rear of the housing base between the mounting posts.

* * * * *